Figure 1:
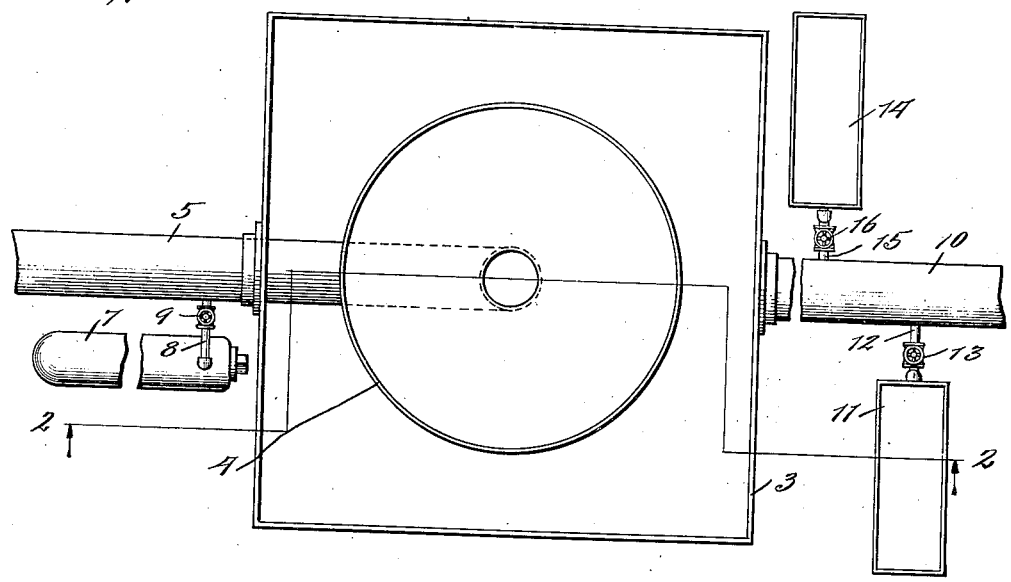

W. B. BULL.
METHOD OF PURIFYING WATER.
APPLICATION FILED MAY 27, 1909.

935,637.

Patented Oct. 5, 1909.

Witnesses:

Inventor:
William B. Bull,
by Bond Adams Pickard Jackson,
his Attys.

UNITED STATES PATENT OFFICE.

WILLIAM B. BULL, OF CHICAGO, ILLINOIS.

METHOD OF PURIFYING WATER.

935,637.  Specification of Letters Patent.  Patented Oct. 5, 1909.

Application filed May 27, 1909. Serial No. 498,755.

*To all whom it may concern:*

Be it known that I, WILLIAM B. BULL, a citizen of the United States, residing at Chicago, in the county of Cook and State of Illinois, have invented a new and Improved Method of Purifying Water, of which the following is a specification, reference being had to the accompanying drawings.

My invention relates to the purification of water for potable purposes, and has particularly to do with the purification of water on a large scale for municipalities and industrial purposes by the use of a coagulant capable of agglomerating the impurities so as to facilitate and insure their removal by sedimentation or filtration through a granular filter-bed. Heretofore several processes of this kind have been extensively employed for this purpose,—one of the best known being what is known as the "iron and lime process", which consists in adding to the water to be purified a small percentage of copperas in solution and then adding lime water to precipitate the iron salt in the form of a hydrate, the precipitate being flocculent in character and serving to agglomerate the impurities so that they quickly subside in a settling chamber or may be effectively removed by passing the water through a granular filter-bed. This process as well as prior processes involving the use of sulfates of iron and aluminum are objectionable, however, for several reasons, but particularly because of the great expense attending their use not only for chemicals but also for labor, as, although the proportionate quantities of iron, salt and lime used are relatively small, in the aggregate they are large, particularly in the operation of a municipal water-plant.

The object of my invention is to provide a new and improved process of water purification, by the use of which the proportionate quantities of the iron, aluminum, or equivalent salts, and lime employed may be very materially reduced, and in some cases eliminated altogether where the condition of the water treated is such as to enable that to be done, thereby reducing the expense to a very substantial extent and making it practicable to employ my said process in many cases where the expense of employing the older processes would be prohibitive. In all processes of this kind the efficacy of the process for purification purposes depends upon the formation of an adequate flocculent precipitate which may be removed by sedimentation or filtration through a granular filter-bed, retaining with it the impurities contained in the water, and the practicability of such processes, from a commercial standpoint, depends upon the production of such precipitate at a comparatively low cost.

The iron and lime process above referred to has hitherto been considered one of the most successful processes, as it has met the conditions mentioned more satisfactorily than other processes, but I have discovered a method by which water may be purified at a very much lower cost with results equally as good, and in many cases much better, than are obtained by the use of said iron and lime process. Moreover, as is well known, a given water varies from time to time in its condition so as to necessitate variation in the manner of treating it to effect adequate purification, and my improved process is such that it is easily adaptable to the various changes occurring in the water from time to time, so that satisfactory purification under the varying conditions of the water is readily obtained.

My invention consists in passing water containing carbonic acid gas ($CO_2$) in an upward direction through a mass of iron filings or comminuted iron in other suitable form, thereby producing in the water carbonate of iron, and in precipitating the iron salt contained in the water by subjecting it to the action of slaked lime or lime-water, thereby forming a flocculent precipitate of hydrate of iron which carries down the impurities and facilitates their removal by sedimentation or filtration. At some seasons of the year the water to be treated naturally contains a considerable percentage of carbonic acid gas, and at such times it is not necessary to introduce any considerable amount of free carbonic acid gas into the water before passing it through the iron filings, but generally the addition of such carbonic acid gas is required, and in such cases it is introduced by means of any suitable apparatus by connecting a tank containing liquid carbonic acid gas with the water supply pipe which leads to the receptacle containing the iron filings.

In order to provide for adding a suitable soluble metallic salt, such as soluble sulfate of iron, to the water for use in emergencies, in the apparatus illustrated I have shown means for supplying such salt directly to the water, but ordinarily the introduction of a metallic salt to the water is not required.

Ordinarily the entire volume of water to be purified is passed through the iron filings, but if desired, a portion only of the water may be so treated, and after the formation of the precipitate the portion treated may be added to the rest of the water,—the precipitate or coagulant being removed after the entire volume of water has been subjected to its action.

Figure 2:
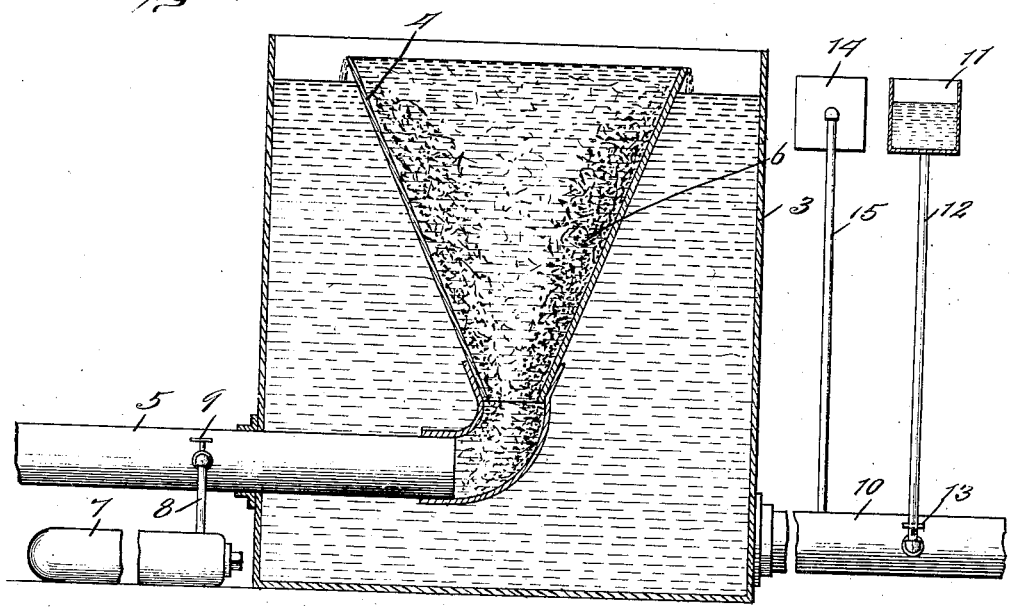

In the accompanying drawings I have illustrated a simple form of apparatus for carrying out my said process, Figure 1 being a plan view thereof; and Fig. 2 a vertical section on line 2—2 of Fig. 1.

Referring to the drawings,—3 indicates a tank adapted to receive the water after it passes through the iron filings, and 4 indicates a funnel-shaped receptacle arranged within the tank 3, its upper margin being below the upper edge of said tank so that the overflow from the receptacle 4 is received by said tank. The receptacle 4 is adapted to contain iron filings, and is connected at its lower end with an inlet pipe 5 through which enters the water to be purified. 6 indicates the iron filings in the receptacle 4. 7 indicates a gas tank adapted to contain carbonic acid gas under pressure, preferably in liquid form, said tank communicating with the inlet pipe 5 through a pipe 8 provided with a valve 9. 10 indicates an outlet pipe leading from the tank 3, through which the water in said tank is discharged. 11 indicates a tank adapted to contain lime-water. Said tank communicates with the outlet pipe 10 through a pipe 12 provided with a valve 13. 14 indicates a tank adapted to contain a solution of a suitable metallic salt,—said tank communicating by a pipe 15 having a valve 16 with the outlet pipe 10. By this construction the admission of carbonic acid gas, lime-water or the metallic salt solution may be readily controlled and regulated. It will be noted that the water to be purified flows upward through the mass of iron filings in the receptacle 4, causing a violent ebullition thereof and subjecting the particles of iron thoroughly to the action of the water, which takes up a greater or less percentage of the iron, depending upon the proportionate quantity of carbonic acid gas contained therein.

That which I claim as my invention, and desire to secure by Letters Patent, is,—

1. The method of purifying water, which consists in introducing carbonic acid gas thereinto, then passing the charged water through a mass of comminuted iron, and then adding slaked lime or lime-water to the resulting solution.

2. The method of purifying water, which consists in introducing carbonic acid gas thereinto, then passing the charged water upward through a mass of comminuted iron, and then adding slaked lime or lime-water to the resulting solution.

WILLIAM B. BULL.

Witnesses:
JOHN L. JACKSON,
MINNIE A. HUNTER.